Figure 1:
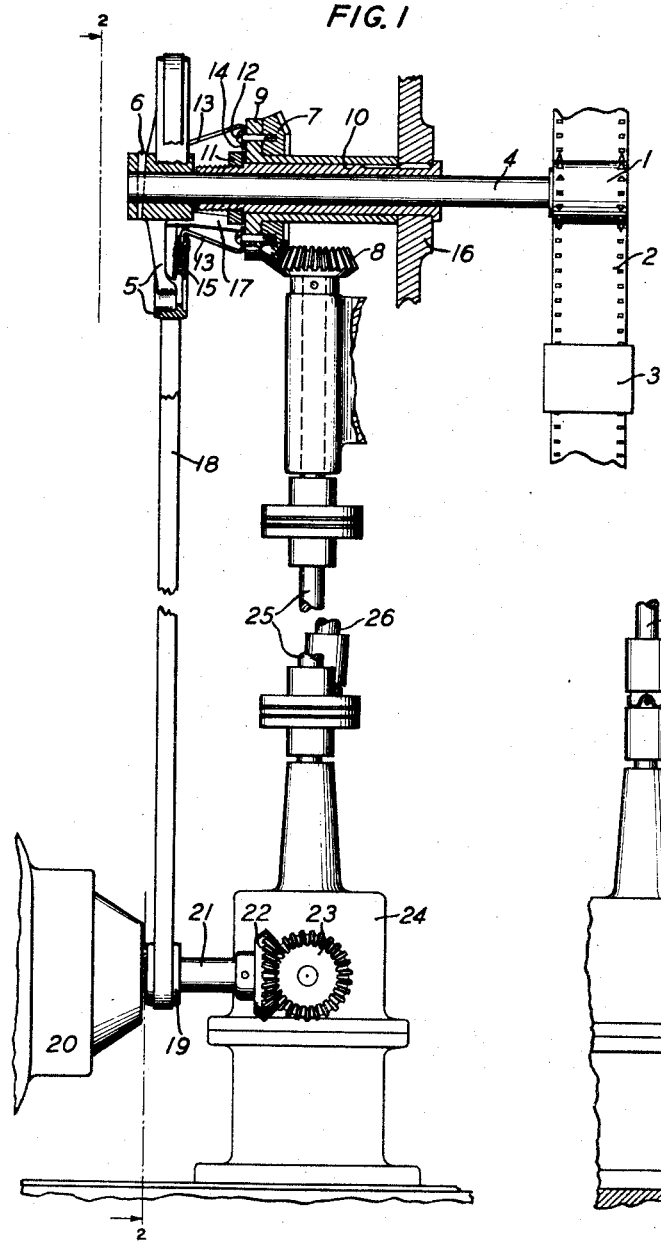

March 30, 1937.  J. G. ROBERTS  2,075,783
SOUND PICTURE SYSTEM
Filed Oct. 12, 1934

INVENTOR
J. G. ROBERTS
BY
G. H. Heydt
ATTORNEY

Patented Mar. 30, 1937

2,075,783

UNITED STATES PATENT OFFICE 2,075,783

SOUND PICTURE SYSTEM

John G. Roberts, Dobbs Ferry, N. Y., assignor to Bell Telephone Laboratories, Incorporated, New York, N. Y., a corporation of New York Application October 12, 1934, Serial No. 747,999

6 Claims. (Cl. 271—2.3)

This invention relates to sound picture apparatus, and more particularly to a mechanism for driving the sound reproducing or recording apparatus at uniform velocity.

In sound picture apparatus in which the sound and scene are simultaneously translated, it is common practice to drive the sound and picture translating apparatus from a common source of power to insure synchronous translation. In apparatus of this general character the picture record is intermittently moved but translated when it is not in motion, while the accompanying sound effects are recorded or reproduced with the record carrying medium in continuous motion. The movement of this record carrying medium must be controlled as to uniformity to an extent which prevents the intrusion of velocity variations which cause noticeable sound pitch variations.

According to the present invention the sprocket which feeds the film past the point of sound translation, herein known as the sound sprocket, is provided with a secondary source of power in multiple with the common source of power, for controlling both a sustained velocity rate and uniformity of velocity at that rate. These sources of power comprise a set of motor-driven gears and a motor-driven belt connected in tandem multiple to the sound sprocket shaft. The gears are connected to the shaft through an elastic member in the form of springs and the belt pulley is rigidly connected to the shaft. Because of slight irregularities or imperfections in gears and bearings which cause momentary deviations in a sustained velocity, it becomes necessary to differentiate between a sustained velocity rate and uniformity of velocity at this sustained rate. The sustained velocity rate may be defined in this instance as the speed required for moving the film past the point of sound translation in synchronism with the movement of the film past the picture lenses. If there are no variations in this sustained rate, it then becomes uniform velocity. The gears connected to the sound sprocket shaft through an elastic member are driven in synchronism with the gears which control the movement of the film past the picture lenses and consequently these gears control the sustained rate of velocity of the sound sprocket. The belt drive is arranged to rotate the sprocket shaft at approximately the same velocity as the gears, or at a rate which is slightly increased to compensate for the inherent creep of the belt on the pulleys. The ratio of the belt pulleys may be arranged to slightly augment the natural creep of the belt and thus allow the springs of the elastic member to be stretched a given amount. This action presses the gear teeth toward each other in the non-driving direction, but the sprocket is driven only at a rate permitted by the velocity of the gears. When the springs have been stretched to a given stiffness the belt creep increases slightly, which condition is sustained during the period of driving the film through the sound picture apparatus.

It is recognized that the most troublesome periodic low frequency irregularities occur in the gears and bearings of the mechanical transmission system throughout the sound picture apparatus. These irregularities are to some extent transmitted to the gears which drive the sound sprocket shaft and if transmitted to the sound sprocket cause variations in the film velocity. With the foregoing multiple drive, when such irregularities occur at the gears a momentary deviation in the uniformity of gear velocity is present. However, since the belt pulley is rigidly connected to the sprocket shaft, the belt drive momentarily becomes the controlling factor to hold the sound sprocket to a true uniform velocity and cause the gear velocity variation to be absorbed by the springs between the gears and the sprocket shaft. Any velocity variations present in the belt drive are of high frequency which are readily checked by the springs under restraint of the gears.

It is well known that synchronous relation can not be expected between two disassociated belt drives or between one apparatus driven by a belt and another driven by gears. The difference in velocities is particularly due to the inherent creep of the belt on the pulley. This belt creep can be made such that the difference in velocity would not be noticeable during a short run of film. It is, therefore, apparent that in the combination according to the invention the velocity control of the sound sprocket may at intervals, during gear velocity variations, be transferred to the belt drive for obtaining both a sustained velocity rate and uniformity of velocity at that rate.

Figure 2:
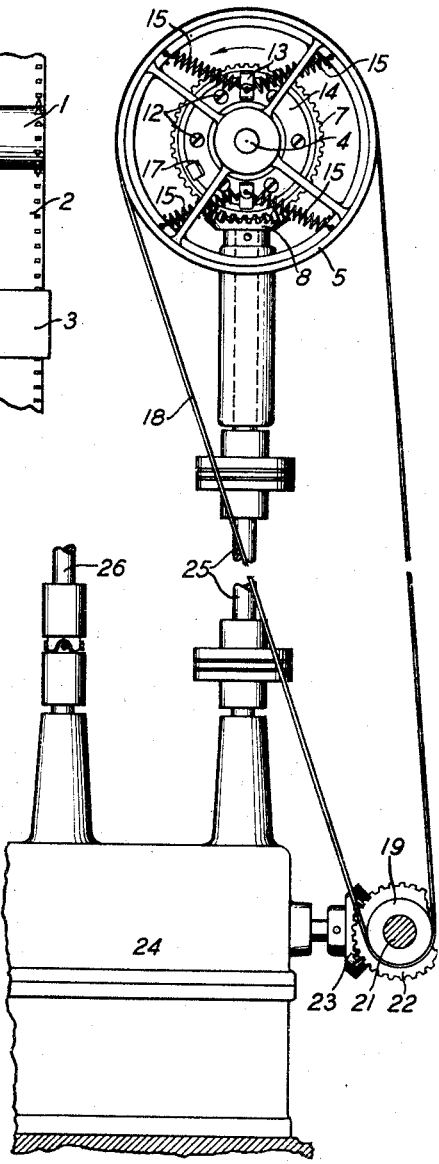

Figs. 1 and 2 illustrate two views of the film driving mechanism according to the invention.

In the sound picture apparatus of Figs. 1 and 2, the motor 20 is shown for synchronously driving the mechanical transmission system through gears 22 and 23 for guiding the film past both the picture and sound translating apparatus.

This motor is also equipped with belt pulley 19 mounted on its armature shaft 21 for driving the belt 18 which drives the pulley 5. The gear 23 is connected to reduction gears enclosed in gear box 24 for drive shafts 25 and 26. Shaft 26 is connected to the apparatus of a picture head which may be of various well-known types. Shaft 25 is connected to the apparatus of the sound unit through gear 8. The foregoing elements are accurately regulated as to a sustained velocity rate by speech regulating apparatus substantially as disclosed in Patents 1,662,083, 1,662,084 and 1,662,085 issued March 13, 1928.

The film 2 is fed past the sound translating apparatus diagrammatically shown at 3 by the cylindrical sprocket 1 rigidly connected to shaft 4. Shaft 4 is journaled in bearing 10 which is mounted in frame 16 and keyed in position as shown. Gear 7, sleeve 9 and the spring spider 13—14 are fastened together by machine screws 12 and are arranged to rotate as a unit on the bearing 10. The end portion of bearing 10 is threaded for adjusting nut 11 for holding the gear 7 in the correct meshing relation with gear 8. The belt pulley 5 is rigidly connected to the sprocket shaft 4 by pin 6. The manner of connecting the springs 15 between the spider 13—14 and the belt pulley 5 is best shown in Fig. 2. The spider comprises an annular member 14, spring supports 13 and detent 17. The springs 15 are interconnected between the spring supports 13 and the rim of the belt pulley 5.

Since the pulley 5 is rigidly connected to the sprocket shaft 4, the spring supporting arrangement is the equivalent of an elastic connection between the gear 7 and the film propelling cylinder or sprocket 1. The springs 15 are shown in the non-operating position. When the sound picture machine is driven at its normal running speed, the belt creep causes an elongation of the upper left and lower right springs and a shortening of the upper right and lower left springs. The teeth of gear 7 are thus pressed against the teeth of gear 8 in the non-driving direction of the gears. The stiffness of the springs is light, but is sufficient when stretched a given distance to increase the belt creep the slight amount necessary to establish a fixed relation between the pulley 5, springs 15 and gears 7 and 8 during running of the film. Momentary angular velocity variations of the gears due to irregularities in the mechanical transmission system may change this relation for some fractional part of a second. The variation in the gear, however, causes only a slight linear flexing of the springs which is not of sufficient amplitude to noticeably affect the velocity of the pulley 5. It is, therefore, apparent that during these intervals of momentary deviation in gear velocity, the belt pulley is restrained in its normal fixed relation by the springs which, as stated, do not greatly vary from the stiffness which is fixed during the running of the film and consequently the sprocket 1 is rotated at a true uniform velocity.

What is claimed is:

1. In strip feeding mechanism, a cylinder for feeding said strip, and means for driving said cylinder at uniform velocity, comprising motor-driven gears connected through an elastic member to said cylinder and a belt-driven pulley connected to said cylinder in multiple with said gears and elastic member.

2. In strip feeding mechanism, a cylinder for feeding said strip, driving means continuously connected to said cylinder, comprising a mechanical transmission system driven at a sustained velocity connected through an elastic member to said cylinder in multiple with a belt-driven pulley, both being rotated at approximately the same angular velocity, either said mechanical system or said pulley system being capable of sustaining uniform velocity of the cylinder in the case of momentary deviations in uniform velocity of the alternate.

3. In strip feeding mechanism, a cylinder for feeding said strip mounted on a shaft, and means for driving said cylinder, comprising a mechanical transmission system having a train of gears driven at a sustained velocity connected to said shaft through an elastic member, a belt-driven pulley rotated at approximately the same angular velocity as said gears connected to said shaft in multiple with said transmission system, said multiple driving means being each arranged for separately sustaining uniform velocity of the cylinder in the case of momentary deviations in uniform velocity of the alternate.

4. In strip feeding mechanism, a cylinder for feeding said strip, means continuously connected to said cylinder for driving it at uniform velocity, comprising a mechanical transmission system driven at a sustained velocity with momentary deviations in velocity due to irregularities, an elastic member between said transmission system and said cylinder, and a belt-driven pulley said pulley being rotated at approximately the same angular velocity as said system for sustaining uniform velocity of said cylinder during said deviations.

5. In a film feeding arrangement for sound picture apparatus, a mechanical transmission system for feeding the film past the picture and sound translating positions in synchronism, including a set of gears connected through an elastic member to a cylinder for guiding the film past the point of sound translation, and a belt-driven pulley connected to said cylinder in multiple with said mechanical transmission system driven at approximately the same angular velocity as said gears for maintaining the uniform velocity of said cylinder.

6. In strip feeding mechanism, a cylinder for feeding said strip, and means continuously connected to said cylinder for driving it continuously at the same uniform velocity rate, comprising a gear drive having an elastic member between the gears and cylinder and a friction drive connected in multiple with said gear drive.

JOHN G. ROBERTS.